United States Patent
Grimes

(10) Patent No.: US 6,171,048 B1
(45) Date of Patent: Jan. 9, 2001

(54) FIRE SUPPRESSION AGENT STORAGE CONTAINER LIFTING AND TRANSPORTATION DEVICE

(76) Inventor: Carl Joseph Grimes, 198 Gaskins Rd., Dickson, TN (US) 37055

(*) Notice: Under 35 U.S.C. 154(b), the term of this patent shall be extended for 0 days.

(21) Appl. No.: 09/484,907

(22) Filed: Jan. 18, 2000

(51) Int. Cl.[7] .................................................. B60P 3/055
(52) U.S. Cl. .......................... 414/458; 414/427; 414/495; 414/459
(58) Field of Search .................................. 414/495, 458, 414/459, 427

(56) References Cited

U.S. PATENT DOCUMENTS

| | | | |
|---|---|---|---|
| 2,396,368 | * 3/1946 | Gorrell et al. | 414/458 |
| 3,760,964 | * 9/1973 | Trapp | 414/458 |
| 3,768,676 | * 10/1973 | Spitzer | 414/459 |
| 4,491,452 | * 1/1985 | Matovich | 414/458 X |
| 5,035,269 | * 7/1991 | Pytryga | 141/1 |
| 5,145,311 | * 9/1992 | Salvucci | 414/592 |
| 5,779,255 | * 7/1998 | Garcia, Jr. | 414/458 X |

FOREIGN PATENT DOCUMENTS

| | | | |
|---|---|---|---|
| 3443163 | * 4/1986 | (DE) | 414/458 |
| 1521124 | * 8/1978 | (GB) | 414/459 |

* cited by examiner

Primary Examiner—Steven A. Bratlie

(57) ABSTRACT

A cart which is provided with lifting jacks (26) and wheels on casters (28) providing a means of vertically lifting and transporting a fire suppression agent storage container in an upright position. The apparatus is designed to lift from the base of the container without requiring a lifting element to be placed beneath said fire suppression agent storage container. The base of the container is coupled to the apparatus by the use of clamping frames (24). Once the clamping frames (24) are fully engaged around the container base, the lifting jacks (26) can be operated to lift the container. Once the container is lifted, the container can then be easily moved by rolling entire apparatus along a surface by way of the wheels on casters (28).

2 Claims, 4 Drawing Sheets

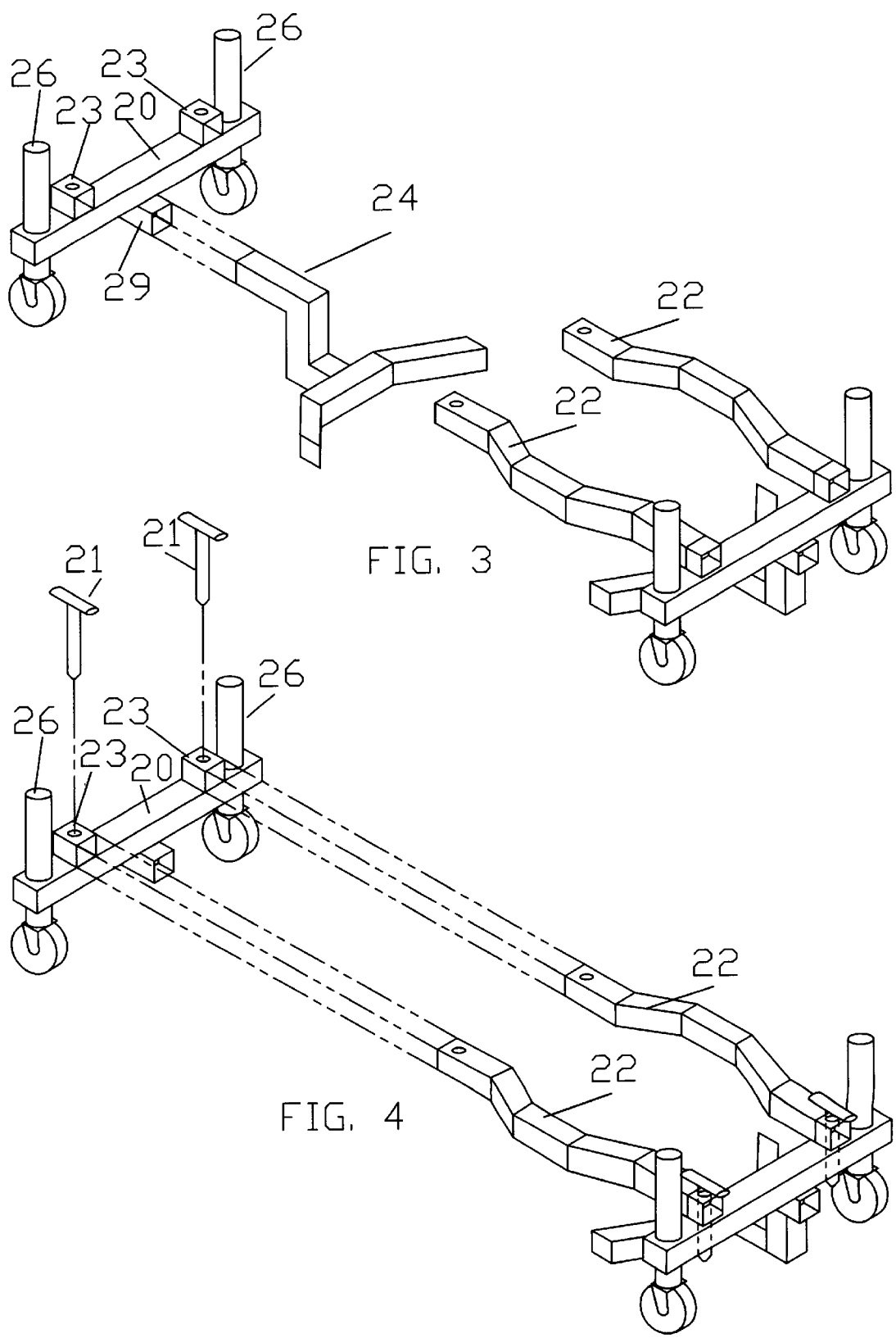

FIRE SUPPRESSION AGENT STORAGE CONTAINER LIFTING AND TRANSPORTATION DEVICE

CROSS-REFERENCE TO RELATED APPLICATIONS

Not applicable.

STATEMENT REGARDING FEDERALLY SPONSORED RESEARCH AND DEVELOPMENT

Not Applicable.

BACKGROUND

1. Field of Invention

This invention relates to the lifting and moving of fire suppression agent storage cylinders used within the fire protection industry.

2. Description of Prior Art

Fire protection equipment manufacturer's commonly supply their distributors with fire suppression agent storage cylinders. These storage cylinders can have a gross weight of approximately 1800 lbs when filled with a fire suppression agent. The storage cylinders are commonly shipped on a wooden pallet to facilitate handling during shipping. Other than utilizing a forklift or a crane, there has not been a simple device invented to facilitate the distributor nor the end user in removing these cylinders from the shipping pallet or moving these cylinders to their planned location.

SUMMARY

A device with a frame, a clamping device, a plurality of wheels and a plurality of lifting jacks in combination provides a means of lifting and moving a fire suppression agent storage cylinder.

OBJECTS AND ADVANTAGES

The objects and advantages of my invention are:

(a) to provide a safe means of lifting a fire suppression agent cylinder from the shipping pallet.

(b) to provide a safe and efficient means of moving a fire suppression agent cylinder without the need for a forklift or a crane.

Further objects and advantages are to provide a cylinder lifting unit that gives a fire protection contractor or an end-user the ability to safely move a fire suppression agent cylinder. To provide a safe working environment for the contractors employees thus reducing the amount of insurance and workman's compensation claims. To provide a cylinder lifting unit that is compact and easily transported, reducing the amount of heavy equipment needed when installing and servicing these cylinders. To provide a cylinder lifting unit that is able to pass through a standard size door while being used to move a fire suppression agent cylinder. To provide a cylinder lifting unit that will make it easier for a fire protection contractor to utilize these large cylinders within their fire suppression system design, thus allowing the manufacturer and the fire protection contractor to sell more of these large cylinders. Still further objects and advantages will become apparent from a consideration of the ensuing description and drawings.

DRAWING FIGURES

Figure 1:
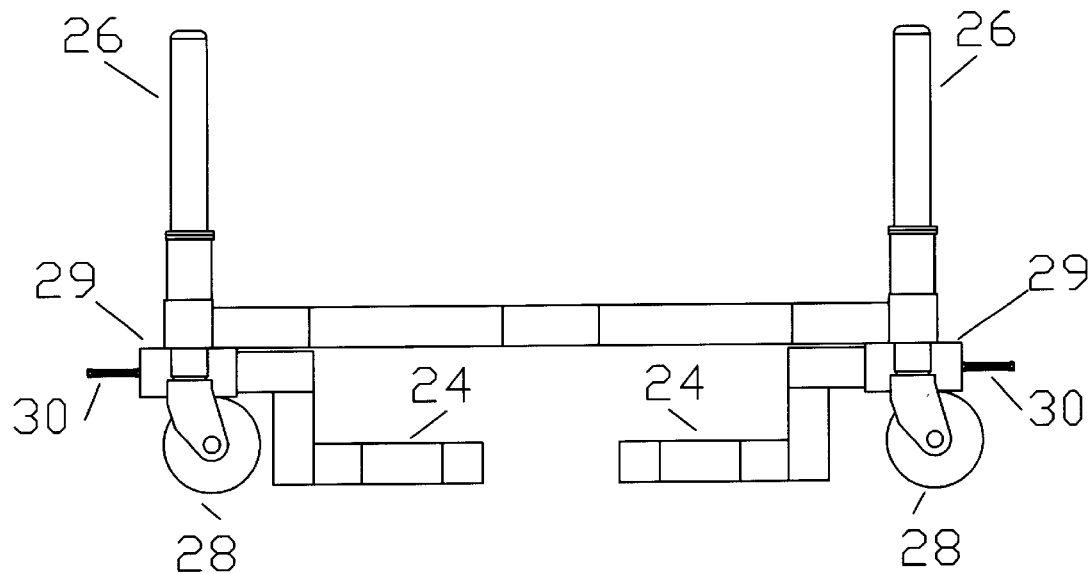
Figure 2:
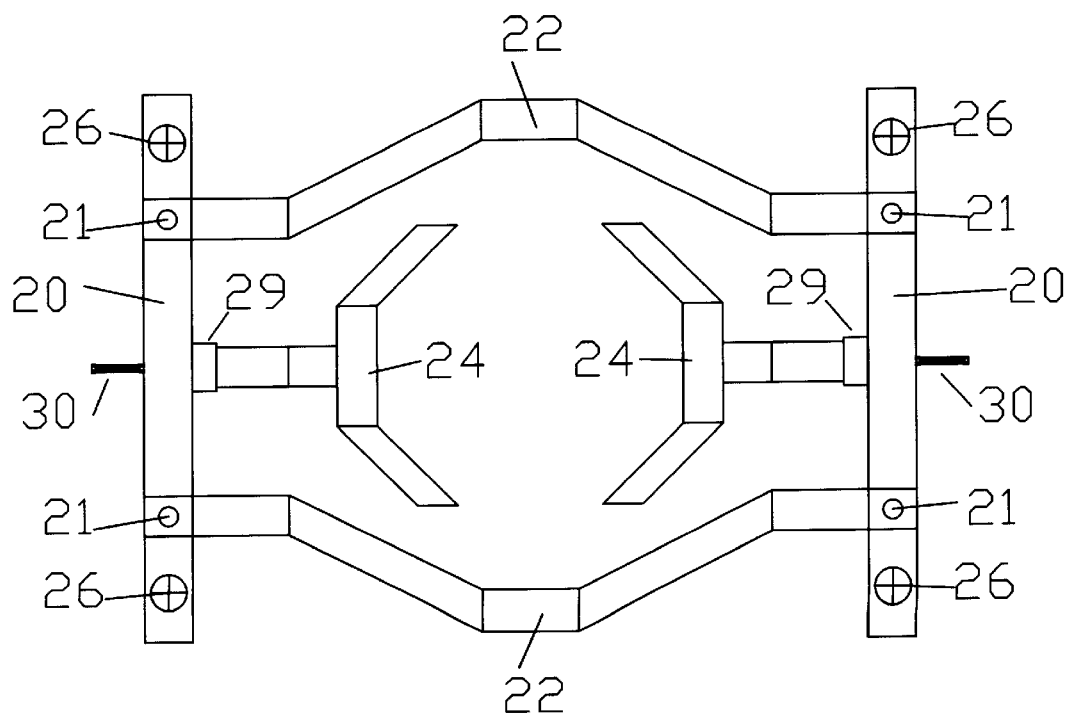
Figure 5:
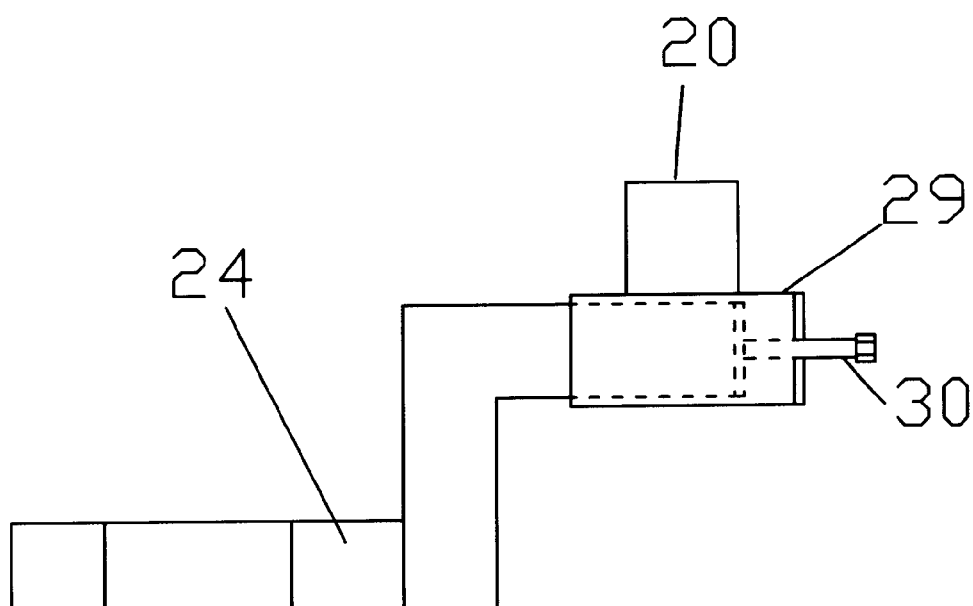
Figure 6:
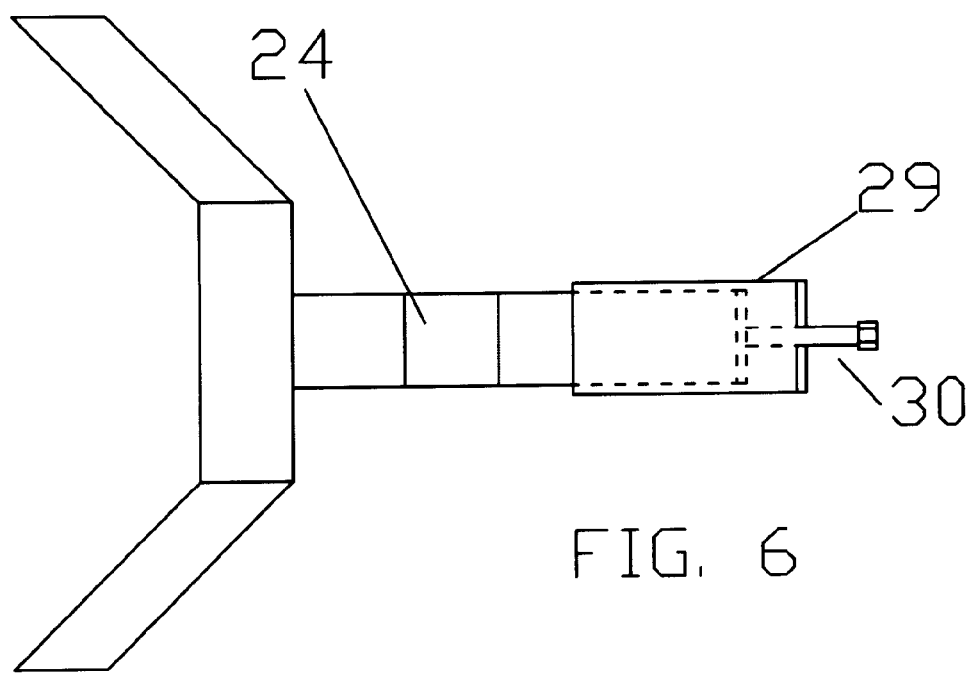
Figure 7:
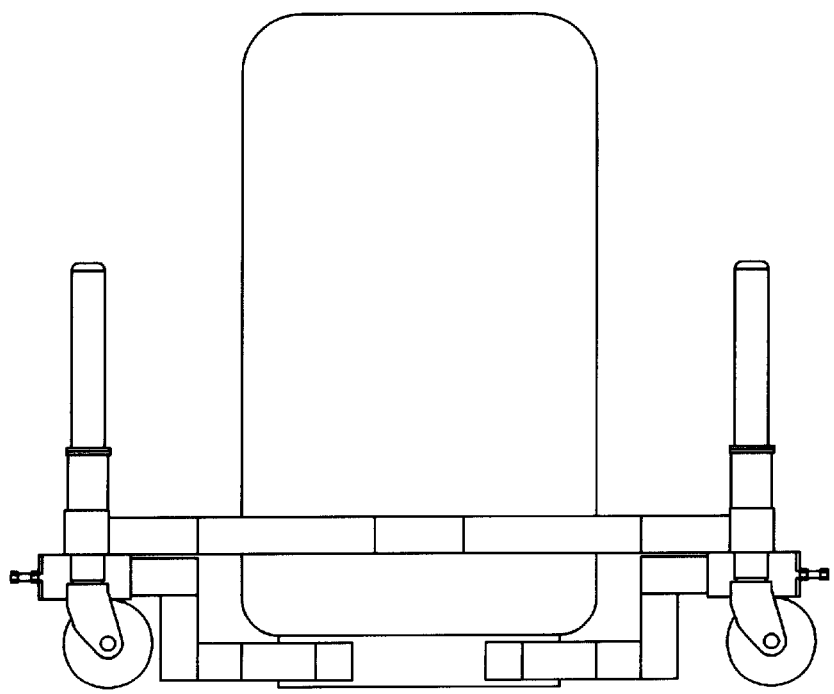
Figure 8:
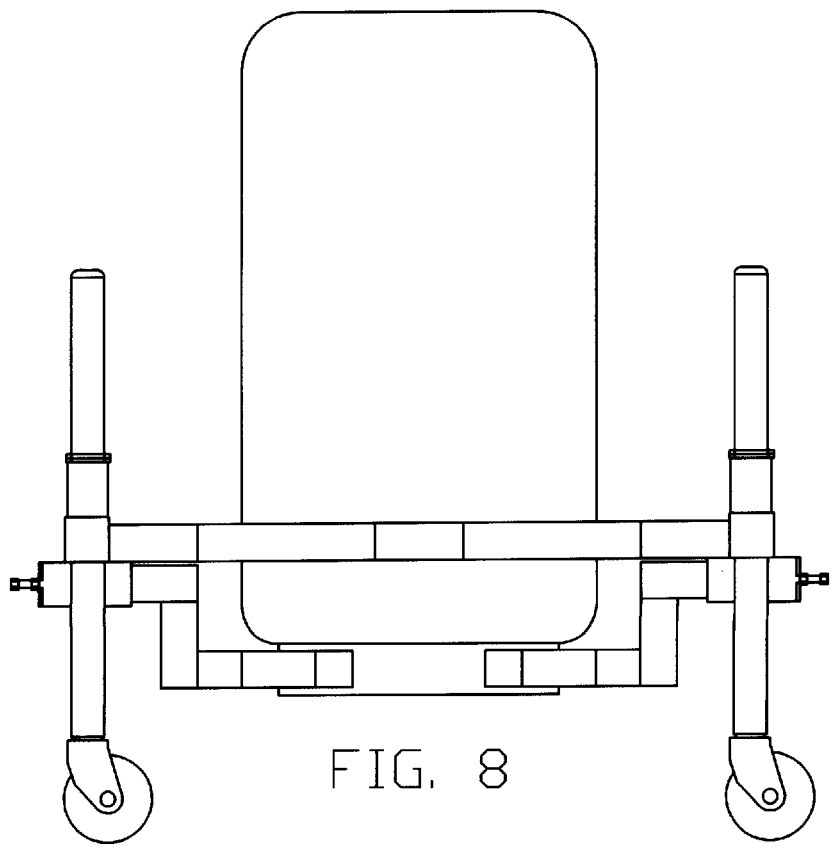

FIG. 1 Elevation View
FIG. 2 Plan View
FIG. 3 Isometric View
FIG. 4 Isometric View
FIG. 5 Elevation View of Clamping Frame
FIG. 6 Plan View of Clamping Frame
FIG. 7 Shows device clamped to cylinder.
FIG. 8 Shows device lifting cylinder.

DESCRIPTION

FIG. 1, FIG. 2, FIG. 3, FIG. 4, FIG. 5 and FIG. 6

Preferred Embodiment

A preferred embodiment of the fire suppression agent storage container lifting and transportation device of the present invention is illustrated as noted in the above listed figures. The device has two lifting frames 20 of uniform design. There are two cross frames 22 that are of uniform design and are inserted into cross frame receiving collars 23 and are secured together by securing pins 21.

Each lifting frame 20 is shown with two lifting jacks 26 and two wheels on casters 28. These items 26 and 28 have been patented under several previous numbers. It is not the intent of this invention to try to obtain a patent on any particular style of lifting jack 26 or style of wheels on casters 28. This invention merely utilizes these items in a manner in which the inventor believes to be unique for the purpose stated herein.

There are two clamping frames 24 that are inserted into the clamping frame receiving collars 29. At one end of the clamping frame receiving collar 29 is a clamping frame adjustment bolt 30. The clamping frame adjustment bolt 30 is used to adjust clamping frame 24 tightly against the bottom most section of the fire suppression agent storage container to be lifted.

The lifting frames 20, cross frames 22, cross frame receiving collars 23, clamping frames 24 and clamping frame receiving collars 29 are shown as fabricated square metal tubing and should be of sufficient size and strength to allow for the lifting of the heaviest fire suppression agent storage container. The design of cross frames 22 and clamping frames 24 will vary slightly with the manufacturer's design of fire suppression agent storage containers.

An assembled device should not be more than approximately 34 inches wide. This is to accommodate the passing through of a standard size door. An assembled device length should be of sufficient length to accommodate a standard size wooden pallet as used during shipping the fire suppression agent storage container. This is approximately 46 inches.

Advantages

From the description above, a number of advantages of my fire suppression agent storage container lifting and transportation device become apparent:

(a) The device can be easily disassembled and is compact enough to be easily transported.

(b) The device provides a safe means of lifting a fire suppression agent storage container.

(c) The device unit can be easily manufactured with readily obtainable materials.

(d) The device will easily pass through a standard door while in use.

(e) The device provides a means of transporting a large fire suppression agent storage container within confined spaces such as computer rooms, telecommunication switchgear rooms and similar spaces that may utilize these fire suppression agent storage containers.

Operation

FIGS. 3, 4, 5, 6, 7 & 8

The operation of the device is quite simple. Position clamping frames 24 around the base of the fire suppression agent storage container 180 degrees from each other. Place one lifting frame 20 in proximity of one clamping frame 24. Slide clamping frame 24 into clamping frame receiving collar 29. Slide cross frames 22 into cross frame receiving collar 23 and secure with securing pins 21. Place remaining lifting frame 20 in position sliding clamping frame 24 into clamping frame receiving collar 29. Slide remaining ends of cross frames 22 into remaining cross frame receiving collar 23 securing with remaining securing pins 21. Tighten clamping frame adjustment bolts 30 until base of fire suppression agent storage container is tightly secured. Unit should appear as FIG. 7.

Operate lifting jacks 26 to lift fire suppression agent storage container as shown in FIG. 8. The fire suppression agent storage container can be restrained for added safety with a number of restraining straps available on the market. Once the fire suppression agent storage container is lifted from the shipping pallet or lifted from the floor, the fire suppression agent storage container can be easily moved by one or two people by rolling on the wheels on casters 28.

CONCLUSION, RAMIFICATIONS AND SCOPE

Herewith the reader will see that the invention of the device can be easily utilized to lift and move large fire suppression agent storage containers. Furthermore the device will provide additional advantages in that it permits the fire protection contractor to utilize labor and equipment efficiently.

it permits the fire protection contractor to utilize larger fire suppression agent storage containers which translates into fewer storage containers.

it permits the fire protection contractor to easily service these large storage vessels during an annual inspection where the fire suppression agent storage container has to be lifted to be placed on a scale.

it permits the fire protection equipment manufacturer to sell more large storage vessels.

it reduces the amount of injuries to service and installation personnel due to back strain or other lifting related injuries.

it can be easily manufactured by someone skilled in the art of metal fabrication.

it can be easily adapted to fit various size fire suppression agent storage containers by altering the design of the clamping frame.

Although the description above contains many specificities, these should not be construed as limiting the scope of the invention but as merely providing illustrations of some of the presently preferred embodiments of this invention. The invention may be made from some other material that provides the same strength loading as the material suggested in this description.

Thus the scope of the invention should be determined by the appended claims and their legal equivalents, rather than by the example given.

I claim:

1. Apparatus for lifting, from a shipping pallet or other surface, a fire suppression agent storage container in a vertical position then transporting the container upon a surface with said apparatus comprising: two square rigid lifting frames interconnected by square rigid elongated cross frames, said square rigid elongated cross frames are slidably inserted into square rigid cross frame receiving collars welded or attached by some other process to each square rigid lifting frame secured by retaining pins, rigid mounting facilities for lifting jacks with casters, said lifting jack rigid mounting facilities receiving lifting jacks, welded or attached by some other process, perpendicular to the top of the outermost ends of each square rigid lifting frame with appropriate holes through the square rigid lifting frame to allow the lifting jacks to telescope through said holes allowing movement, in the vertical plane, when the lifting jacks are operated, each said square rigid lifting frame has a square rigid clamping frame receiving collar welded or attached by some other process to the center of the square rigid lifting frame bottom surface perpendicular to the lifting frame, two square rigid trihedral clamping frames designed in such a manner that the portion of the clamping frame that engages the base of the fire suppression agent storage container is of trihedral shape to allow the square rigid trihedral clamping frames to self-center radially about the base of the fire suppression agent storage container thus allowing the two square rigid trihedral clamping frames to be placed 180 degrees from each other slidably engaging the square rigid clamping receiving collars attached to each square lifting frame, means of adjustment for each rigid trihedral clamping frame to move slidably inside of the square rigid clamping frame receiving collar, whereby the means of adjustment on the square rigid clamping frame receiving collar may be operated to cause the square rigid trihedral clamping frames to slidably move horizontally toward each other allowing a clamping force to be applied to the base of the fire suppression agent storage container securely restraining the fire suppression agent storage container for the purpose of lifting and transporting, said lifting jacks allowing a telescoping portion of each lifting jack to pass through an associated hole of said square rigid lifting frames causing a downward force to be exerted on said casters causing said square lifting frames with square rigid trihedral clamping frames and elongated square rigid cross frames to rise in a vertical plane causing the fire suppression agent storage container to rise allowing the fire suppression agent storage container to be safely moved upon a surface.

2. Apparatus according to claim 1, wherein each said square rigid elongated cross frame is of trihedral design, along it's length, to allow the square rigid elongated cross frame to attach to square rigid lifting frame in a position to the inside of the lifting jack rigid mounting facilities location allowing overall width of final assembly to be no greater than 34 inches accommodating a container that is 30 inches in diameter, thus allowing the lifting jacks to be mounted in a position at each end of the square rigid lifting frame providing the widest possible wheelbase and still maintain an overall width of no greater than 34 inches.

* * * * *